United States Patent [19]
Statt

[11] Patent Number: 5,276,779
[45] Date of Patent: Jan. 4, 1994

[54] METHOD FOR THE REPRODUCTION OF COLOR IMAGES BASED ON VIEWER ADAPTION

[75] Inventor: David J. Statt, Rochester, N.Y.
[73] Assignee: Eastman Kodak Company, Rochester, N.Y.
[21] Appl. No.: 678,485
[22] Filed: Apr. 1, 1991
[51] Int. Cl.$^5$ .............................................. G06F 15/62
[52] U.S. Cl. ........................... 395/109; 395/131; 358/500
[58] Field of Search ................ 395/109, 131; 340/703; 358/76, 80

[56] References Cited

U.S. PATENT DOCUMENTS 5,073,818  12/1991  Iida ........................................ 358/80
5,081,529   1/1992  Collette ................................. 358/80
5,172,224  12/1992  Collette et al. ..................... 358/80

Primary Examiner—Mark K. Zimmerman
Attorney, Agent, or Firm—Mark Z. Dudley

[57] ABSTRACT

Color digital image signals generated by scanning an original or by a computer color graphics application are converted to signals representing normalized cone response values based on a color adaptation model of the human visual system. The cone response values are normalized to the white point of the input color digital image. The normalized cone response values are denormalized to the viewer adaptation point of the output viewing conditions of the output medium. The denormalized cone response values are transformed to signals for reproducing the digital color image.

22 Claims, 2 Drawing Sheets

METHOD FOR THE REPRODUCTION OF COLOR IMAGES BASED ON VIEWER ADAPTION

TECHNICAL FIELD

This invention relates to: 1) the reproduction of color images, and more particularly to such methods of reproducing color images that visually match those that are viewed on a color monitor screen, including the step of processing a digital color image in a computer and, 2) the reproduction of images or charts created on a computer using a color monitor as a visulation tool.

BACKGROUND ART

In the art of desk top publishing it is known to produce charts, graphics and illustrations by the selection and manipulation of graphics and text objects using a color monitor as a visulation tool and reference. Manipulation of objects includes the selection and/or adjustment of color. In this circumstance the visual appearance of the screen becomes the reference or original for reproduction. In other words, the colors that you see on the monitor are the colors that you want to see in the hard copy reproduction that is made by the system.

In the graphic arts it is known to reproduce a color image by scanning an original to produce a digital color image signal, processing the digital color image signal in a digital computer to produce a processed digital color image signal, and reproducing the color image from the processed digital image signal. This type of reproduction attempts to match the colors to the colors of the original color image. Although the present system can process original images by scanning negatives and other forms of hard prints it is directed more towards those applications where the image is first brought into existence by the operator interfacing with the computer and causing the image to be created by known color digital image processing techniques while using the color monitor to view the creation.

Attempts have been made to base the color digital image processing on a three color vision model of the human eye. In this so called tristimulus method, three color signals are determined from three linearly independent color mixture functions that are theoretically some linear function of the three color sensitivities of the human eye. In such systems, colors with the same tristimulus values, under the same viewing conditions, are perceived by persons with normal color vision as being identical. The goal has been to achieve a so called colorimetric or tristimulus match between an original and a reproduction, where the original is an original scene, a color CRT image, or an original photograph, and the reproduction is a CRT image or hard copy image produced by a color printer or color film scanner.

In one approach, as described in U.S. Pat. No. 4,409,614; issued Oct. 11, 1983 to Eichler et al., signals ($E_R E_G E_B$) from a scanner, such as a color film scanner, are converted into three visual sensitivity based primary color signals (X,Y,Z). These signals may be subjected to a white balance for a $D_{65}$ illuminant, and are then converted into coloring signals adapted to the basic coloring materials of the reproduction system. In one embodiment, the primary color signals are stored on a video tape recorder. Means are provided for modifying the adapted signals. The primary color signals from the recorder are subjected to the adaptation for the reproduction system and displayed on a color TV to show the effects of modifying the signals. When a desired modification has been achieved, the modified, adapted signals are supplied to a printer.

In another approach, as described in U.S. Pat. No. 4,500,919 issued Feb. 19, 1985 to Schreiber, tristimulus signals produced by a film scanner are displayed on a CRT without regard to any adaptation to any output medium. The tristimulus signals are subjected to aesthetic corrections by an operator, and the result viewed on the CRT. When the desired result is achieved on the CRT, the aesthetically corrected tristimulus signals are employed to produce corresponding reproduction signals to produce a colorimetric match in an output medium.

In both of the prior art approaches described above, there is an implicit assumption that the viewing conditions of the original and the reproduction will be identical. This is important since only then will a "colorimetric" match be equivalent to a visual appearance match. This result is due to the phenomenon known as "adaptation" whereby a human observer adapts to the color temperature of the ambient lighting conditions such that the visual appearance of different colors remains constant, even though the measured colorimetric values of the colors under the different illuminants change markedly. If a "colorimetric" match is made between an original image and its reproduction under different lighting conditions, the colors in the images will not appear the same to a viewer that is adapted to the different lighting conditions. Because of this, a considerable effort has been directed in the prior art to providing identical viewing conditions for an original and its reproduction. See for example U.S. Pat. No. 4,500,919 cited above.

The provision of identical viewing conditions however requires expensive hardware comprising light boxes and viewing booths and is not considered to be practical for the desk top publishing market. Furthermore, the prior art systems would at best. optimize the reproduced image for one set of viewing conditions but not for others.

SUMMARY OF THE INVENTION

It is therefore the primary object of the present invention to provide a method for creating a color hard copy of images, graphs etc. that are first created, prepared, and viewed on a color monitor screen. The method will yield a visual appearance match between the original, as viewed on the monitor screen, and the hard copy reproduction, as viewed under different lighting conditions.

It is a further object of the present invention to provide a method that does not rely on apparatus for providing special lighting conditions when viewing the original on the monitor and its reproduction.

It is yet a further object of the present invention to provide a method for the reproduction of color images formed on a color monitor that employs a model of the human visual phenomenon of adaptation.

The above objects are achieved according to the present invention by transforming the digital image signals, corresponding to the images viewed on a color monitor, to signals representing normalized cone response values based on a color adaptation model of the human visual system. The cone response signals are normalized to the viewer adaptation white point values for the input color digital image. The normalized cone response signals are then transformed to denormalized cone response signals denormalized to the viewer adaptation point of the output medium. The signals representing the denormalized cone responses are then transformed to signals for reproducing the digital color image on the output medium. Finally the color digital image is reproduced on the output medium employing the signals for reproducing.

DESCRIPTION OF THE INVENTION

Throughout the present specification the term image(s) will appear. The term as used is intended to encompass: images that are scanned into the system put primarily it is intended to cover images that are created for the first time on the face of a color monitor by the operator along with graphics, bar charts, and other types of illustrations.

Figure 1:
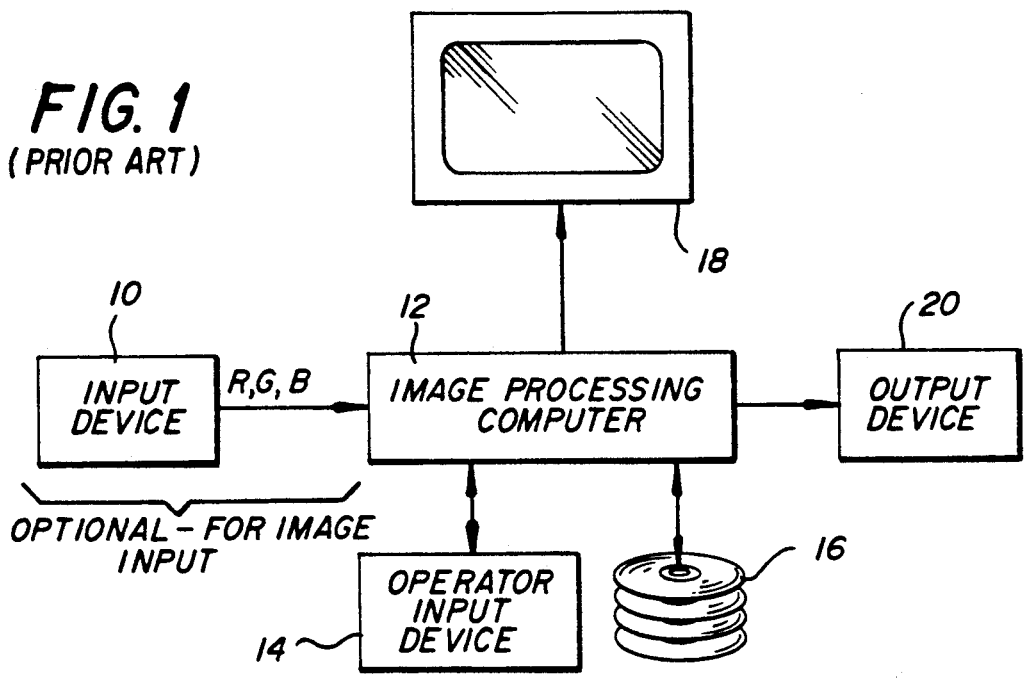
FIG. 1 is a schematic diagram of a system for processing a digital color image according to the present invention.

A system for processing color images according to the invention is shown in FIG. 1. The image processing system may be connected to an input device 10, such as a color film scanner, an electronic camera, or a computer color graphics generator when it is desired to accommodate the entry of images, such as those contained on film negatives, into a computer 12. The input device 10 supplies a digital color signal R,G,B to the computer 12. The computer 12, which may comprise either a general purpose personal computer, or a special purpose computer designed for image and/or graphics processing, performs selected operations such as the rendering of graphic objects or the creation and processing of images under the control of an operator, via an operator input device 14 such as a keyboard or a mouse as the operator views the screen of a color monitor 18. Processed and unprocessed images, graphics information and text can be stored in a data store 16, such as a magnetic or optical storage device. The processed or unprocessed color digital images, as viewed on the color monitor 18, may then be reproduced as a hard copy by a hard copy output device 20. The hard copy output device 20 may be, for example be, a thermal or laser color printer.

According to the present invention, the visual appearance of an image as viewed on the monitor is matched on hard or soft displays by modeling the adaptation mechanisms in the human eye. By visual appearance match is meant that a viewer adapted to the respective viewing conditions will receive the subjective impression that the colors of both familiar and unfamiliar objects are not dependent on the viewing conditions. Thus a white shirt will be seen as white, whether seen inside a building under very warm incandescent lighting or under fluorescent lighting or outdoors under cold lighting. The adaptation mechanisms in the human visual system are complicated and only partially understood, but can be divided into two general categories for purposes of the present invention. These are "full adaptation" and "partial adaptation." Full adaptation occurs in generally well lit situations such as outdoors in daylight or in a reasonably well lit room. It is characterized by a typical person being for the most part completely unaware of white or color differences in different lighting.

Partial adaptation occurs in subdued lighting and is characterized by two effects. First, the observer begins to see white objects as having a distinctly non-white cast. For example, usually yellowish orange under incandescent lighting or bluish under full moonlight. Second, there is an apparent decrease in contrast that occurs when relatively bright images are projected in an otherwise darkened room.

According to the present invention, these effects are predicted and compensated so that consistent visual appearance is preserved between, computer or TV displays and hardcopy color outputs.

With 100% or full adaptation, the visual appearance of an image is matched on hard or soft displays by converting the digital image to retinal cone responses normalized to the white point of the image illuminant; denormalizing the normalized image for the white point of the display, and converting the denormalized image to tristimulus values for display.

Figure 2:
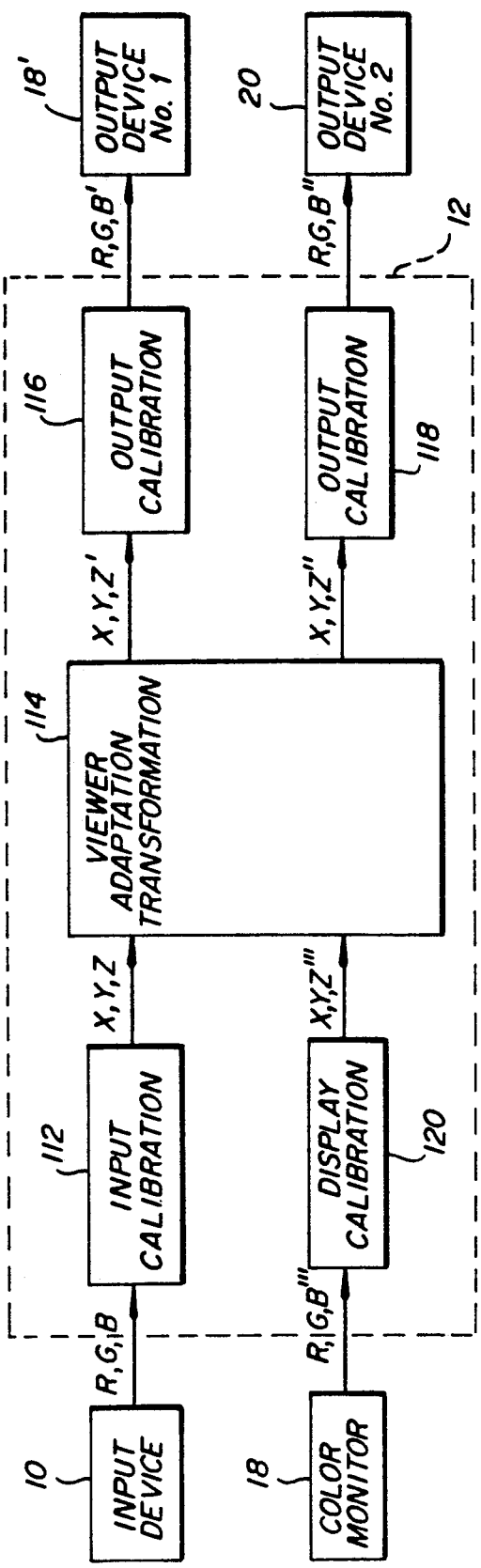
FIG. 2 is a schematic diagram showing the steps involved in generating, processing, and displaying a color image signal according to the present invention.

Referring now to FIG. 2, the following steps are performed in generating and displaying an image according to the present method.

Digital color information signals R,G,B generated by the input device 10 are directed to an input calibration and transformation function 112 located in the computer 12. The R,G,B signals are transformed to color image signals in a reference color space such as a tristimulus value color space X,Y,Z by an input calibration and transformation function 112. Alternately, the R,G,B signals may be generated by an operator utilizing an application program residing in the computer 12. Regardless of the source of the tristimulus value signals X,Y,Z they are transformed by a viewer adaptation transformation function 114 into signals X,Y,Z', X,Y,Z'', and X,Y,Z'''. Generally speaking the input calibration 112 and the viewer adaptation transformation 114 functions along with output calibration functions 116, 118 and the display calibration 120 are embodied in software that is executed upon by the computer 12. The computer 12 employs the viewer adaptation transformation 114 to color adapt the tristimulus signals X,Y,Z', X,Y,Z'', or X,Y,Z''' such that the appearance on one or more different output media under one or more different viewing conditions will match the image viewed on the screen of the color monitor 18 and also will match each other when viewed by an observer adapted to the viewing conditions of the monitor 18 or the respective output media. By appearance match is meant that a viewer adapted to the respective input or output viewing conditions will receive the subjective impression that the images match. Side-by-side comparisons of the images are not necessarily made, since the viewer adapts to the viewing conditions peculiar to the particular image or output medium.

The color adapted tristimulus values XYZ' or XYZ'' are transformed by the output calibration processes 116 or 118 to provide signals R,G,B' or R,G,B'', respectively, to drive, in a manner well known in the art, a first output device such as a a color monitor 18 or a second output device such as a thermal printer 20.

The steps employed in the viewer adaptation transformation function 114 will now be described with reference to FIG. 3.

First, the tristimulus values X,Y,Z of the image are converted to absolute cone responses $P\Gamma\beta_{in}$ (24) employing a color adaptation model of human color perception, such as the model proposed by R. W. G. Hunt modified for equal energy state of adaptation. (Ref: "The Production of Color", Fountain Press, 4th edition, 1987, section A2.2).

$$(P\Gamma\beta_{in}) = [V_m] \times \begin{vmatrix} X \\ Y \\ Z \end{vmatrix}, \quad (1)$$

where $$(V_m) = \begin{vmatrix} .38971 & .68898 & -.07868 \\ -.22981 & 1.18340 & .04641 \\ 0 & 0 & 1.0 \end{vmatrix}$$

is a transformation according to Hunt's model for converting tristimulus values to absolute cone responses for an equal energy state of adaptation (i.e. $X_0, Y_0, Z_0 = 1$).

It should be noted that $V_m$ may be multiplied by any vector $$\begin{vmatrix} k_1 \\ k_2 \\ k_3 \end{vmatrix}$$

without affecting the present method.

Next, the absolute cone responses are normalized (26) to the desired white point of the image illuminant by dividing the equal energy cone response values of the image by the equal energy cone response values $P_I\Gamma_I\beta_I$ of the white point of the illuminant, found by:

$$\begin{vmatrix} P_D \\ \Gamma_D \\ \beta_D \end{vmatrix} = [V_m] \times \begin{vmatrix} X_I \\ Y_I \\ Z_I \end{vmatrix} \quad (2)$$

where $X_I, Y_I, Z_I$ are the tristimulus values for the white point of the image illuminant or the tristimulus values of the monitors' CRT white point if the image was computer generated on a CRT.

The white point of the image illuminant can be measured when the image is recorded, estimated from the image, for example as shown in U.S. Pat. No. 4,685,701 issued Aug. 4, 1987 to H-C. Lee, or known from the circumstances of generating the image, for example by knowing the white point of a film scanner or CRT.

The normalized cone responses $P\Gamma\beta_{in}$ are given by:

$$\begin{matrix} P \\ \Gamma \\ \beta_{in} \end{matrix} = \begin{vmatrix} 1/P_I & 0 & 0 \\ 0 & 1/\Gamma_I & 0 \\ 0 & 0 & 1/\beta_I \end{vmatrix} \begin{matrix} P \\ \times \Gamma \\ \beta_{in} \end{matrix} \quad (3)$$

The normalized cone responses are then denormalized (28) by multiplying them by the absolute cone responses for the white point of the desired display device or output viewing conditions to produce absolute output cone response values $P\Gamma\beta_{out}$ given by:

$$\begin{matrix} P \\ \Gamma \\ \beta_{out} \end{matrix} = \begin{vmatrix} P_D & 0 & 0 \\ 0 & \Gamma_D & 0 \\ 0 & 0 & \beta_D \end{vmatrix} \begin{matrix} P \\ \times \Gamma \\ \beta_{in} \end{matrix} \quad (4)$$

where $P_D\Gamma_D\beta_D$ are the absolute cone response values for the white point of the output device determined as follows:

$$\begin{vmatrix} P_D \\ \Gamma_D \\ \beta_D \end{vmatrix} = [V_m] \times \begin{vmatrix} X_D \\ Y_D \\ Z_D \end{vmatrix}, \quad (5)$$

where $(X_D, Y_D, Z_D)$ are the tristimulus values of the white point of the desired display device or output viewing conditions.

Finally, the denormalized output cone response values are converted (30) to output tristimulus values XYZ' employing an inverse of the color adaptation model of human color perception noted above.

$$(X,Y,Z') = [V_m^{-1}] \begin{vmatrix} P \\ \Gamma \\ \beta_{out} \end{vmatrix}, \quad (6)$$

where $$[V_m^{-1}] = \begin{vmatrix} 1.91022 & -1.11214 & .20191 \\ .37094 & .62906 & 0 \\ 0 & 0 & 1.0 \end{vmatrix}$$

The partial adaption case can be modeled in a manner very similar to that for full adaptation. That is, the tristimulus values of the image are converted to cone responses $\pi\gamma\beta$ as described above. Next the cone responses are modified to account for adaptation using the following equations for the $\beta$ cones which are approximations to the Hunt model:

$$\beta_{rel} = (F_{in}(\beta)\beta_{in}/\beta_{win})^{1/\Gamma_{in}} \quad (7)$$

where:
$F_{in}(\beta) = (\beta_{win}/\beta_{weqen})^{1-\alpha_{in}}$
$\beta_{rel}$ = relative adapted cone response
$\beta_{weqen} = \beta$ cone response from an equal energy light source with the same luminance as the input white point,
$\beta_{win} = \beta$ cone response from the white point for the input viewing conditions,
$\Gamma_{in}$ = Input contrast reduction term,
$\alpha_{in}$ = Input degree of adaptation.

By making the appropriate substitutions, the following equations are derived;

$$\rho_{rel} = \left(\left(\frac{\rho_{win}}{\rho_{weqen}}\right)1 - \alpha_{in}\frac{\rho_{in}}{\rho_{win}}\right)1/\Gamma_{in},$$

$$\gamma_{rel} = \left(\left(\frac{\gamma_{win}}{\gamma_{weqen}}\right)1 - \alpha_{in}\frac{\gamma_{in}}{\gamma_{win}}\right)1/\Gamma_{in},$$

$$\beta_{rel} = \left(\left(\frac{\beta_{win}}{\beta_{weqen}}\right)1 - \alpha_{in}\frac{\beta_{in}}{\beta_{win}}\right)1/\Gamma_{in}.$$

To determine the correct cone response for the state of output adaptation, the following equations for the $\beta$ cones are used:

$$\beta_{out} = \beta_{rel}\Gamma_{out}\beta_{wout}/F_{out}(\beta), \qquad (8)$$

where $F_{out}(\beta) = (\beta_{wout}/\beta_{weqen})^{1-\alpha_{out}}$
$\beta_{wout} = \beta$ cone responses from the white point for the output viewing conditions,
$\Gamma_{out}$ = Output contrast reduction term,
$\alpha_{out}$ = Output degree of adaptation.

Making the appropriate substitutions, the following equations can be written:

$$\pi_{out} = \pi_{rel}\Gamma_{out}\pi_{wout}/(\pi_{wout}/\pi_{weqen})^{1-\alpha_{out}},$$

$$\gamma_{out} = \gamma_{rel}\Gamma_{out}\gamma_{wout}/(\gamma_{wout}/\gamma_{weqen})^{1-\alpha_{out}},$$

$$\beta_{out} = \beta_{rel}\Gamma_{out}\beta_{wout}/(\beta_{wout}/\beta_{weqen})^{1-\alpha_{out}},$$

Contrast reduction terms, $\tau_{in}$ or $\tau_{out}$, of the order of 1.0 to 1.4 are used for input and output viewing conditions respectively with;

1.05 to 1.1 applying to a video display terminal in a subdued room lighting,
1.0 applying to hard copy output viewed in an average lit room,
1.1 to 1.4 applying to a slide projected in a darkened theatre.

Generally the input adaptation factor $a_{in}$ will be 1.0. The output adaptation factor $a_{out}$ can vary from 1.0 for outdoor daylight or well lit interiors to 0.0 for moonlight. For office lighting conditions, $a_{out}$ will generally be about 0.6, for CRT viewing conditions, about 0.4, and for slide viewing in a darkened room, 0.2.

Figure 4:
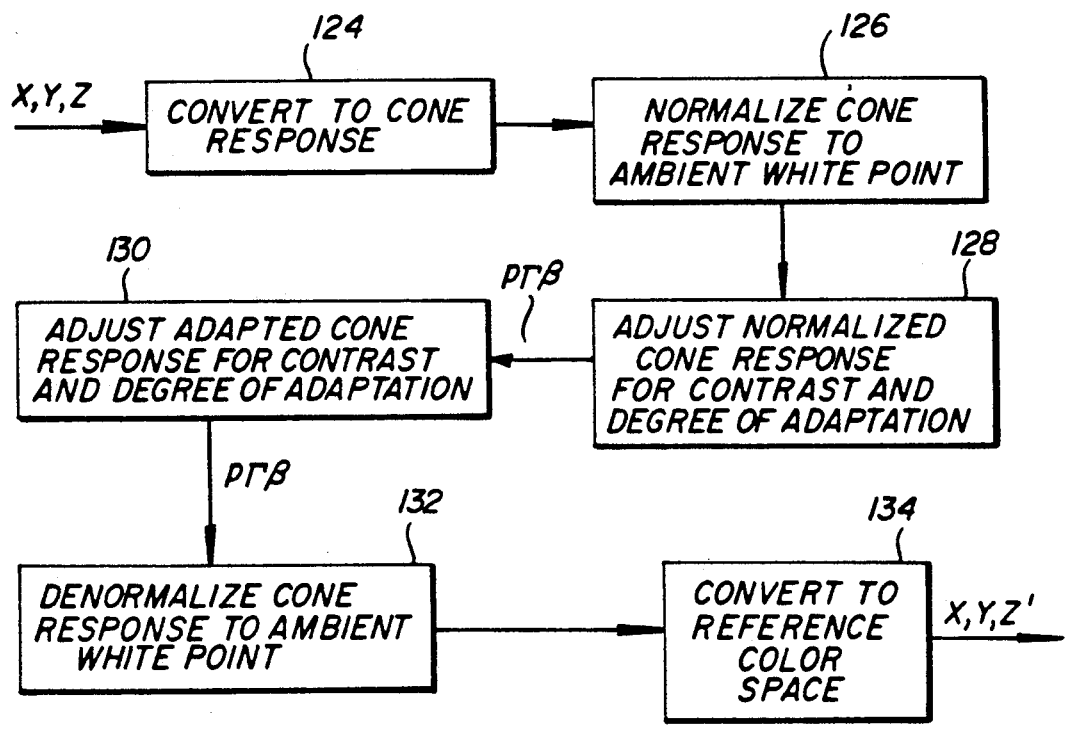
FIG. 4 is a block diagram showing the steps employed in partial viewer adaptation process according to the present invention.

FIG. 4 shows the steps employed in processing an image for partial adaptation viewing conditions according to the present invention. The tristimulus values X,Y,Z are converted to cone responses (124) $P\Gamma\beta_{in}$. The cone responses are normalized to the input white point (126). Next the normalized cone responses are adjusted (128) for input contrast and degree of input adaptation according to equation (7), resulting in adapted cone responses $P\Gamma\beta_{base}$. The adapted input cone responses are then adjusted for the output adaptation conditions (130) employing equation (8) to generate $P\Gamma\beta_{out}$.

The output adapted cone responses are next denormalized (132) to the ambient white point of the output viewing conditions, as shown in equation (4). Finally, the denormalized cone responses are converted (134) to the reference color space X,Y,Z'.

In operation, the processing method of the present invention works as follows. Suppose that objects whose colors are shades of red, green, and blue are being displayed against a white field on a CRT. Suppose also that the relative tristimulus values of the three colors are:

| Shade | X | Y | Z |
| --- | --- | --- | --- |
| Red | 0.365 | 0.222 | 0.324 |
| Green | 0.077 | 0.146 | 0.133 |
| Blue | 0.047 | 0.036 | 0.154 |

Further suppose that the white surround (white point) on the screen produces the following normalized cone responses:

| | $P_I$ | $\Gamma_I$ | $\beta_I$ |
| --- | --- | --- | --- |
| White | 0.974 | 1.015 | 1.168 |

Now suppose that these objects are to be printed onto paper. The paper is intended to be viewed in an office which has cool white fluorescent lights (F2 illuminant). The paper stock to be used for printing produces the following normalized cone responses under this office lighting:

| $P_D$ | $\Gamma_D$ | $\beta_D$ |
| --- | --- | --- |
| 1.016 | .991 | .763 |

Reproducing the red, green, and blue patches onto this paper so that the relative chromaticities of the patches were the same as those on the CRT screen would not produce colors which look the same because in viewing the CRT, the observer has adapted to the white on the screen, and in viewing the paper print, the observer will adapt to the white on the paper. Using the transformation described by equations 1-6, the patches will be reproduced with the following relative chromaticities:

| Shade | X | Y | Z |
| --- | --- | --- | --- |
| Red | 0.369 | 0.223 | 0.212 |
| Green | 0.081 | 0.145 | 0.087 |
| Blue | 0.039 | 0.036 | 0.101 |

As noted above, this is clearly not a "colorimetric" match between the colors on the CRT and the colors produced on the paper. However, the color patches will appear the same to a viewer successively adapted to the respective viewing conditions.

If on the other hand the output were to be viewed under incandescent lighting and the normalized cone responses produced by the paper are 1.090, 0.947, 0.350, the following relative chromaticities will be reproduced using the adaptation transformation described by equations 1-6:

| Shade | X | Y | Z |
| --- | --- | --- | --- |
| Red | 0.395 | 0.226 | 0.097 |
| Green | 0.097 | 0.145 | 0.040 |
| Blue | 0.035 | 0.036 | 0.046 |

If the monitor had a much bluer white point, say 0.963, 1.0, 1.731, then the following chromaticities would be rendered on the CRT in order to replicate the appearances described in the other examples:

| Shade | X | Y | Z |
| --- | --- | --- | --- |
| Red | 0.366 | 0.221 | 0.480 |
| Green | 0.074 | 0.147 | 0.197 |

-continued

| Shade | X | Y | Z |
| --- | --- | --- | --- |
| Blue | 0.057 | 0.036 | 0.023 |

The preceding examples assumed that the lighting for the CRT and the output viewing conditions for both the screen and paper and the surround was fairly bright, i.e. full adaptation.

Assume that the surround of the CRT screen is dim but the paper viewing condition is bright. Under these conditions, the partial adaptation model would be appropriate for the CRT image, and it would be appropriate to use a CRT contrast of 1.1. Employing partial adaptation for the input viewing conditions and full adaptation for the output viewing conditions, the paper chromaticities in accordance with equations 1-3 and 8 will be:

| Shade | X | Y | Z |
| --- | --- | --- | --- |
| Red | 0.407 | 0.256 | 0.238 |
| Green | 0.103 | 0.173 | 0.106 |
| Blue | 0.051 | 0.049 | 0.121 |

Now assume that the paper was illuminated by a bright fluorescent light but the room otherwise was quite dark. In this case it would be appropriate to employ the partial adaptation approach for both the input and output viewing conditions. An appropriate value for the output contrast term would be 1.4 and the resulting chromaticities from equation 7-8 would be:

| Shade | X | Y | Z |
| --- | --- | --- | --- |
| Red | 0.274 | 0.149 | 0.149 |
| Green | 0.039 | 0.086 | 0.048 |
| Blue | 0.018 | 0.014 | 0.058 |

In a case where the CRT and its surround are well illuminated but the output, which is to be viewed under F2 is quite dark, the degree of partial output adaptation can vary between 1 and 0 depending on the brightness. The following table shows the correct output red chromaticities for different degrees of adaption:

| Red | Degree of Adaption | | | | |
| --- | --- | --- | --- | --- | --- |
| | 100% | 80% | 50% | 20% | 0% |
| X | .3691 | .3636 | .3557 | .3483 | .3437 |
| Y | .2234 | .2197 | .2144 | .2091 | .2057 |
| Z | .2116 | .2199 | .2328 | .2465 | .2561 |

The above results are achieved according to the present invention by employing the values for the input and output white points as shown in Table I.

TABLE I

| $D_{65}$ - daylight | | |
| --- | --- | --- |
| X | Y | Z |
| .950 | 1.0 | 1.089 |
| P | Γ | β |
| .974 | 1.016 | 1.089 |
| $D_{50}$ - Combination of daylight and tungsten | | |
| X | Y | Z |
| .964 | 1.00 | .825 |
| P | Γ | β |
| 1.00 | 1.0 | .825 |
| A - Tungsten (2850° K.) | | |
| X | Y | Z |

TABLE I-continued

| 1.098 | 1.00 | .356 |
| --- | --- | --- |
| P | Γ | β |
| 1.098 | .947 | .356 |
| $F_2$ - Fluorescent | | |
| X | Y | Z |
| .992 | 1.0 | .674 |
| P | Γ | β |
| 1.023 | .978 | .674 |
| Ektachrome 100T film projected with A illuminant | | |
| X | Y | Z |
| 1.075 | 1.0 | .348 |
| P | Γ | β |
| 1.081 | .953 | .348 |

For example, with a photographic color slide as the input, and a hardcopy to be viewed under F2 illumination as the output, the operator would make the following choices. If the operator wishes to match the appearance of the hardcopy output with the appearance of the original scene, $P\Gamma\beta_I$ is the eye response of the white point of the original scene illuminant (e.g. D65 in Table I). On the other hand, if the operator wishes to match the appearance of the output to the appearance of the color slide as viewed in a projector, $P\Gamma\beta_I$ is the eye response of the white point of the projector lamp times the spectral transmittance of the slide material at $D_{min}$ (e.g. Ektachrome 100 and the A illuminant in Table I).

Tables of these values are stored in the computer 12 and are selected from a menu by the operator via input device 14.

For the hard copy output, the white point is determined by the paper reflectance and the spectral intensity of the light source (i.e. the white point of the paper under the given light source. To generate the $P\Gamma\beta_D$ for the hardcopy output, a sample of the hardcopy stock is illuminated by a given light source, and the white point $X, Y, Z_D$ is read with a radiometer.

The eye response is then calculated using equation (1). Measurements are made for different hard copy stocks and different light sources and are likewise stored in the image processing computer for access by the operator from a menu via operator input 14.

Figure 3:
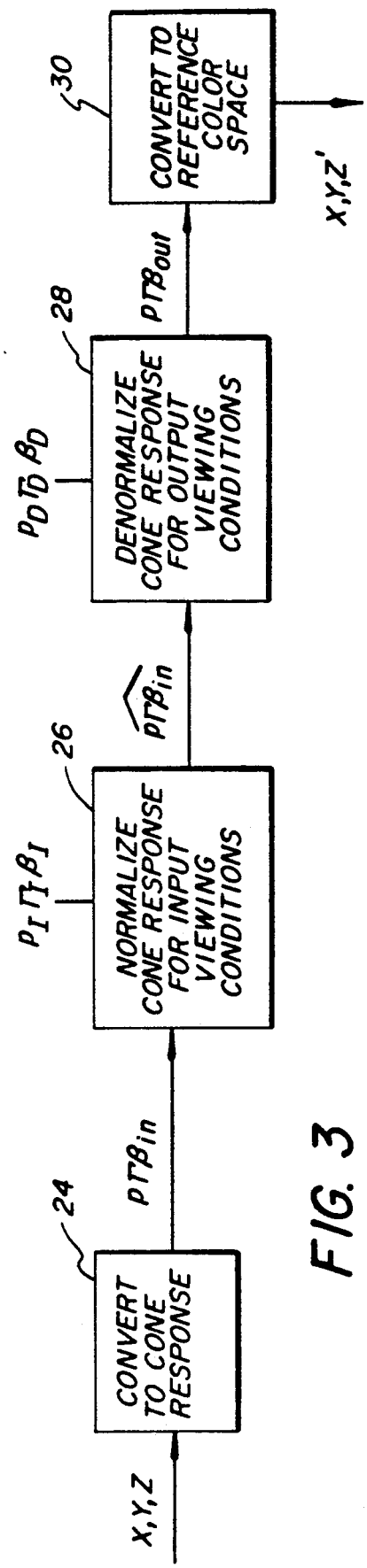
FIG. 3 is a schematic diagram showing the steps employed in the viewer adaptation step shown in FIG. 2.

The entire process described in FIGS. 3 or 4 can be implemented as a single 3-D lookup table in the computer, and therefore can be practiced in a color processing system of the type employing three dimensional lookup tables such as shown in U.S. patent application Ser. No. 07/590,375, filed Sep. 28, 1990 entitled "Color Image Processing System For Programming a Composite Image Transformation Module For Performing a Plurality of Selected Image Transformations", which application is commonly assigned with the present application, and which is incorporated herein by reference.

Industrial Applicability and Advantages

The present invention is useful in the field of color desk top publishing and is advantageous in that it produces identical appearing images on the CRT and any output and does so without requiring that the computer's color characteristics be re-adjusted or that expensive lighting conditions (environments) be created.

What is claimed:

1. A method of reproducing an input color digital image for viewing on an output medium by a viewer comprising the steps of:

a. providing signals representing the input color digital image and a first viewer adaption state associated with the input color digital image;

b. transforming the input color digital image signals to signals representing normalized cone response values based on a color adaption model of a human visual system, the cone response signals being normalized to a first white point value associated with the first viewer adaption state;

c. transforming the signals representing normalized cone response values to signals representing cone responses denormalized to a second white point determined according to a second viewer adaptation state associated with the output medium;

d. transforming the signals representing denormalized cone responses to output signals for reproducing the color digital image on the output medium; and e. reproducing the input color digital image on the output medium according to the output signals.

2. The method claimed in claim 1, wherein the input color digital image is created by a computer and displayed on a CRT, and the first white point associated with the input digital image is the white point of the CRT.

3. The method claimed in 1 or 2 wherein the input image is expressed as XYZ Tristimulus values and the step of transforming the input colors to normalized cone response values is performed according to the relationship as follows:

$$\rho_{rel} = \left( \left( \frac{P_{win}}{P_{weqen}} \right) 1 - \alpha_{in} \frac{P_{in}}{P_{win}} \right)^{1/\Gamma_{in}},$$

$$\gamma_{rel} = \left( \left( \frac{\Gamma_{win}}{\Gamma_{weqen}} \right) 1 - \alpha_{in} \frac{\Gamma_{in}}{\Gamma_{win}} \right)^{1/\Gamma_{in}},$$

$$\beta_{rel} = \left( \left( \frac{\beta_{win}}{\beta_{weqen}} \right) 1 - \alpha_{in} \frac{\beta_{in}}{\beta_{win}} \right)^{1/\Gamma_{in}}.$$

where $(P\Gamma\beta)_{in}$ are absolute cone response values, $(P\Gamma\beta)_{rel}$ are relative cone response values, $(P\Gamma\beta)_{weqen}$ are cone response values to equal energy light related to the first white point, $(P\Gamma\beta)_{win}$ are cone response values related to the first white point, and $\alpha_{in}$ is input degree of adaptation.

4. The method claimed in claims 1 or 2 wherein the output image is expressed as XYZ Tristimulus values and the step of transforming the normalized cone response values to output Tristimulus values is performed as follows:

$$\rho_{out} = \rho_{rel}^{\Gamma_{out}} \rho_{wout}/(\rho_{wout}/\rho_{weqen})^{1-\alpha_{out}},$$
$$\gamma_{out} = \gamma_{rel}^{\Gamma_{out}} \gamma_{wout}/(\gamma_{wout}/\gamma_{weqen})^{1-\alpha_{out}},$$
$$\beta_{out} = \beta_{rel}^{\Gamma_{out}} \beta_{wout}/(\beta_{wout}/\beta_{weqen})^{1-\alpha_{out}}.$$

where $(P\Gamma\beta)_{out}$ are denormalized cone response values, $(P\Gamma\beta)_{rel}$ are relative cone response values, $(P\Gamma\beta)_{weqen}$ are cone response values to equal energy light related to the first white point, $(P\Gamma\beta)_{wout}$ are cone response values related to the second white point, and $\alpha_{in}$ is output degree of adaptation.

5. The method claimed in claim 1, wherein the output medium is a paper print, and the second white point is determined according to an F2 illuminant (fluorescent lighting).

6. The method claimed in claim 1, wherein the output medium is a paper print, and the second white point is determined according to a D-50 illuminant.

7. The method claimed in claim 1, wherein the output medium is a paper print, and the second white point is determined according to a D-65 illuminant.

8. The method claimed in claim 1, wherein the output medium is a paper print, and the second white point is determined according to an A illuminant.

9. The method claimed in claim 1, wherein the output medium is a photographic transparency and the second white point is determined according to the white point of a transparency projection lamp.

10. The method claimed in claim 1, wherein the output medium is a photographic transparency and the second white point is determined according to the white point of a transparency projection lamp multiplied by the value of a selected response of the transparency material at density $D_{min}$.

11. The method claimed in claim 1, wherein the input digital image is provided by scanning a photographic image, and the first white point associated with the input image is the white point of an illuminant employed to expose the photographic image.

12. The method claimed in claim 1, wherein the input digital image is provided by scanning a photographic image, and the white point associated with the input image is the white point of the illuminant employed to view the photographic image.

13. The method claimed in claim 1, wherein the input image is expressed as XYZ tristimulus values, and the step of transforming the input colors to normalized cone response values is performed as follows $$\begin{vmatrix} P \\ \Gamma \\ \beta \end{vmatrix} = \begin{vmatrix} 1/P_I & 0 & 0 \\ 0 & 1/\Gamma_I & 0 \\ 0 & 0 & 1/\beta_I \end{vmatrix} \times |V_m| \times \begin{vmatrix} X \\ Y \\ Z \end{vmatrix}$$

where $$\begin{vmatrix} P \\ \Gamma \\ \beta \end{vmatrix}$$

are the normalized cone responses, $P_I, \Gamma_I, \beta_I$ is an absolute cone response of the white point of the input image, and $|V_m|$ is a matrix relating X,Y,Z tristimulus values to absolute cone responses.

14. The method claimed in claim 13, where $$|V_m| = \begin{vmatrix} k_1(.38971) & k_1(.68898) & k_1(-.07868) \\ k_2(-.22981) & k_2(1.18340) & k_2(.04641) \\ k_3(0) & k_3(0) & k_3(1.0) \end{vmatrix}$$

wherein $k_1$, $k_2$, and $k_3$ are predetermined values.

15. The method claimed in claim 1, wherein the step of transforming the signals representing normalized cone response values to signals representing cone response values denormalized to the second white point is performed as follows:

$$(P\Gamma\beta_{out}) = \begin{vmatrix} P_D & 0 & 0 \\ 0 & \Gamma_D & 0 \\ 0 & 0 & \beta_D \end{vmatrix} \times \begin{vmatrix} P \\ \Gamma \\ \beta_{out} \end{vmatrix},$$

where ($P\Gamma\beta_{out}$) are the denormalized cone response values, and $P_D\Gamma_D\beta_D$ is an absolute cone response derived according to the second white point.

16. The method claimed in claim 1, wherein the step of transforming the signals representing denormalized cone responses further comprises the step of transforming the signals representing denormalized cone responses to X,Y,Z tristimulus values as follows:

$$\begin{vmatrix} X \\ Y \\ Z \end{vmatrix} = |V_m^{-1}| \times \begin{vmatrix} P \\ \Gamma \\ \beta_{out} \end{vmatrix}$$

where $V_m^{-1}$ is the inverse of $V_m$, and ($P\Gamma\beta_{out}$) are the denormalized cone response values.

17. The method claimed in claim 16, wherein $$|V_m^{-1}| = \begin{vmatrix} 1.85995 & -1.12939 & .21990 \\ .36119 & .63881 & 0 \\ 0 & 0 & 1.08906 \end{vmatrix}$$

where $V_m^{-1}$ is the inverse of $V_m$.

18. The method claimed in claim 1, further comprising the step of adjusting the normalized cone response values for input contrast and input degree of adaptation.

19. The method claimed in claim 18, wherein the adjustment of the normalized cone response values is performed as follows:

$$\beta_{base} = (F_{in}(\beta)\beta_{in}/\beta_{win})^{1/\tau_{in}}$$

where
- ($P\Gamma\beta$)$_{in}$=absolute cone response values
- $F_{in}(\beta) = (\beta_{win}/\beta_{equi-energy})^{1-a_{in}}$
- $\beta_{base}$=relative adapted cone response
- $\beta_{equi-energy}$=absolute $\beta$ cone response from an equal energy light source with the same luminance as the input white point,
- $\beta_{win}$=absolute $\beta$ cone response from the white point for the input viewing conditions,
- $\tau_{in}$=Input contrast reduction term,
- $a_{in}$=Input degree of adaptation.

20. The method claimed in claim 1, further comprising the step of adjusting the normalized cone response values for output contrast and degree of adaptation.

21. The method claimed in claim 20, wherein the adjustment of the normalized cone response values is performed according to the relationship:

$$\beta_{out} = (\beta_{rel}^{\Gamma_{out}})\beta_{wout}/F_{out}(\beta)$$

where:
- $F_{out}(\beta) = (\beta_{out}/\beta_{weqen})^{1-a_{out}}$
- $\beta_{wout}$=absolute cone response from the second white point
- $\Gamma_{out}$=output contrast reduction term
- $a_{out}$=output degree of adaptation
- $\beta_{weqen}$=cone response values to equal energy light having luminance related to the first white point.

22. The method claimed in claim 1, further comprising the step of adjusting the normalized cone response values for input contrast and input degree of adaptation, and further adjusting the normalized cone response values for output contrast and output degree of adaptation.

* * * * *